US012720566B2

(12) United States Patent
Sun et al.

(10) Patent No.: US 12,720,566 B2
(45) Date of Patent: Aug. 25, 2026

(54) TRP-SPECIFIC PUSCH TRANSMISSIONS FOR MULTI-TRP OPERATION

(71) Applicant: Apple Inc., Cupertino, CA (US)

(72) Inventors: Haitong Sun, Saratoga, CA (US); Dawei Zhang, Saratoga, CA (US); Huaning Niu, San Jose, CA (US); Oghenekome Oteri, San Diego, CA (US); Seyed Ali Akbar Fakoorian, San Diego, CA (US); Wei Zeng, Saratoga, CA (US); Weidong Yang, San Diego, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/464,419

(22) Filed: Sep. 11, 2023

(65) Prior Publication Data

US 2023/0422337 A1 Dec. 28, 2023

Related U.S. Application Data

(63) Continuation of application No. 17/754,460, filed as application No. PCT/CN2021/085745 on Apr. 6, 2021, now Pat. No. 12,562,863.

(51) Int. Cl.
*H04W 72/232* (2023.01)
*H04B 7/0456* (2017.01)
(Continued)

(52) U.S. Cl.
CPC ........ *H04W 72/232* (2023.01); *H04B 7/0456* (2013.01); *H04L 5/0051* (2013.01);
(Continued)

(58) Field of Classification Search
CPC ............. H04W 72/232; H04W 72/044; H04W 72/1268; H04W 76/20; H04B 7/0456;
(Continued)

(56) References Cited

U.S. PATENT DOCUMENTS

2019/0174466 A1* 6/2019 Zhang .................. H04L 5/0057
2020/0045700 A1* 2/2020 Sun ...................... H04L 5/0091
(Continued)

FOREIGN PATENT DOCUMENTS

CN 111164905 5/2020
WO WO-2020150943 A1 * 7/2020

OTHER PUBLICATIONS

Qualcomm Incorporated, "Enhancements to Scheduling and HARQ for eURLLC", 3GPP TSG-RAN WG1 #96b, R1-1905022, Apr. 8-12, 2019, 6 sheets.

*Primary Examiner* — Ayaz R Sheikh
*Assistant Examiner* — Mang Boi Thawng
(74) *Attorney, Agent, or Firm* — Fay Kaplun & Marcin, LLP

(57) ABSTRACT

A user equipment (UE) is configured to communicate with one or more transmission and reception points (TRPS). The UE receives a sounding reference signal (SRS) resource set configuration including a first resource set corresponding to a first transmission and reception point (TRP) and a second resource set corresponding to a second TRP, receives a downlink control information (DCI) transmission including an SRS resource indicator (SRI) indicating (i) which resource from the first resource set should be selected for a first physical uplink shared channel (PUSCH) transmission to a first TRP, and (ii) which resource from the second resource set should be selected for a second PUSCH transmission to a second TRP and transmits the first PUSCH transmission to the first TRP and the second PUSCH transmission to the second TRP.

18 Claims, 7 Drawing Sheets

(51) Int. Cl.
*H04L 5/00* (2006.01)
*H04W 72/044* (2023.01)
*H04W 72/1268* (2023.01)
*H04W 76/20* (2018.01)

(52) U.S. Cl.
CPC ..... *H04W 72/044* (2013.01); *H04W 72/1268* (2013.01); *H04W 76/20* (2018.02)

(58) Field of Classification Search
CPC ..... H04B 7/024; H04L 5/0051; H04L 5/0035; H04L 5/0044; H04L 5/0048; H04L 5/0094
See application file for complete search history.

(56) References Cited

U.S. PATENT DOCUMENTS

2021/0351960 A1* 11/2021 Huang ................ H04W 72/046
2021/0367655 A1* 11/2021 Jiang .................... H04B 7/0691
2022/0123799 A1* 4/2022 Varatharaajan ....... H04L 5/0048
2022/0150839 A1 5/2022 Islam et al.
2022/0322393 A1* 10/2022 Lin ................... H04W 72/1268
2023/0054488 A1* 2/2023 Manolakos .......... H04B 7/0617
2023/0057080 A1* 2/2023 Khoshnevisan ...... H04W 72/23
2023/0073090 A1 3/2023 Harrison et al.
2023/0171763 A1* 6/2023 Gao ...................... H04W 52/08 370/329
2023/0261836 A1 8/2023 Liu et al.
2023/0262692 A1 8/2023 Lin et al.
2023/0284230 A1* 9/2023 Cirik ................... H04W 72/232 370/328
2023/0362927 A1 11/2023 Sun et al.
2024/0057112 A1* 2/2024 Deghel ................. H04L 5/0035
2024/0080156 A1* 3/2024 Gao ...................... H04L 5/0048
2024/0098740 A1 3/2024 Muruganathan et al.
2024/0114504 A1* 4/2024 Gao ...................... H04L 5/0094
2024/0171331 A1* 5/2024 Liu ....................... H04L 5/0048
2024/0187176 A1* 6/2024 Wang .................... H04W 72/23
2024/0323976 A1* 9/2024 Gao .................... H04W 72/232
2025/0089055 A1 3/2025 Liu

* cited by examiner

| TRP 1 | TRP2 |
| --- | --- |
| RS0 | RS2 |
| RS1 | RS3 |
| RS0, RS1 | RS2, RS3 |

| TRP 1 | TRP2 |
| --- | --- |
| RS0 | RS2 |
| RS0 | RS3 |
| RS1 | RS2 |
| RS1 | RS3 |
| RS0, RS1 | RS2, RS3 |

602

604

| TRP 1 | TRP2 |
| --- | --- |
| RS0 | RS2 |
| RS0 | RS3 |
| RS0 | RS2, RS3 |
| RS1 | RS2 |
| RS1 | RS3 |
| RS1 | RS2, RS3 |
| RS0, RS1 | RS2 |
| RS0, RS1 | RS3 |
| RS0, RS1 | RS2, RS3 |

602

604

TRP-SPECIFIC PUSCH TRANSMISSIONS FOR MULTI-TRP OPERATION

BACKGROUND

In 5G new radio (NR) wireless communications, the 5G NR network may utilize multi-transmission and reception points (TRP) to improve reliability of the wireless channels. For example, multiple physical uplink shared channel (PUSCH) transmissions (e.g., two PUSCHs) may be scheduled for user equipment (UE) transmission via multi-TRPs to improve the throughput of the UE.

SUMMARY

Some exemplary embodiments are related to a processor of a user equipment (UE) configured to perform operations. The operations include receiving a sounding reference signal (SRS) resource set configuration including a first resource set corresponding to a first transmission and reception point (TRP) and a second resource set corresponding to a second TRP, receiving a downlink control information (DCI) transmission including an SRS resource indicator (SRI) indicating (i) which resource from the first resource set should be selected for a first physical uplink shared channel (PUSCH) transmission to a first TRP, and (ii) which resource from the second resource set should be selected for a second PUSCH transmission to a second TRP and transmitting the first PUSCH transmission to the first TRP and the second PUSCH transmission to the second TRP.

Other exemplary embodiments are related to a processor of a user equipment (UE) configured to perform operations. The operations include receiving a transmission and reception point (TRP) configuration from a base station triggering a switching between multi-TRP operation mode and single-TRP operation mode and switching between the multi-TRP operation mode and the single-TRP operation mode based on the configuration.

Still further exemplary embodiments are related to a processor of a base station configured to perform operations. The operations include transmitting, to a user equipment (UE), a sounding reference signal (SRS) resource set configuration including a first resource set corresponding to a first transmission and reception point (TRP) and a second resource set corresponding to a second TRP, transmitting, to the UE, a downlink control information (DCI) transmission including an SRS resource indicator (SRI) indicating (i) which resource from the first resource set should be selected for a first physical uplink shared channel (PUSCH) transmission to a first TRP, and (ii) which resource from the second resource set should be selected for a second PUSCH transmission to a second TRP and receiving, from the UE, the first PUSCH transmission to the first TRP and the second PUSCH transmission to the second TRP.

DETAILED DESCRIPTION

Figure 1:
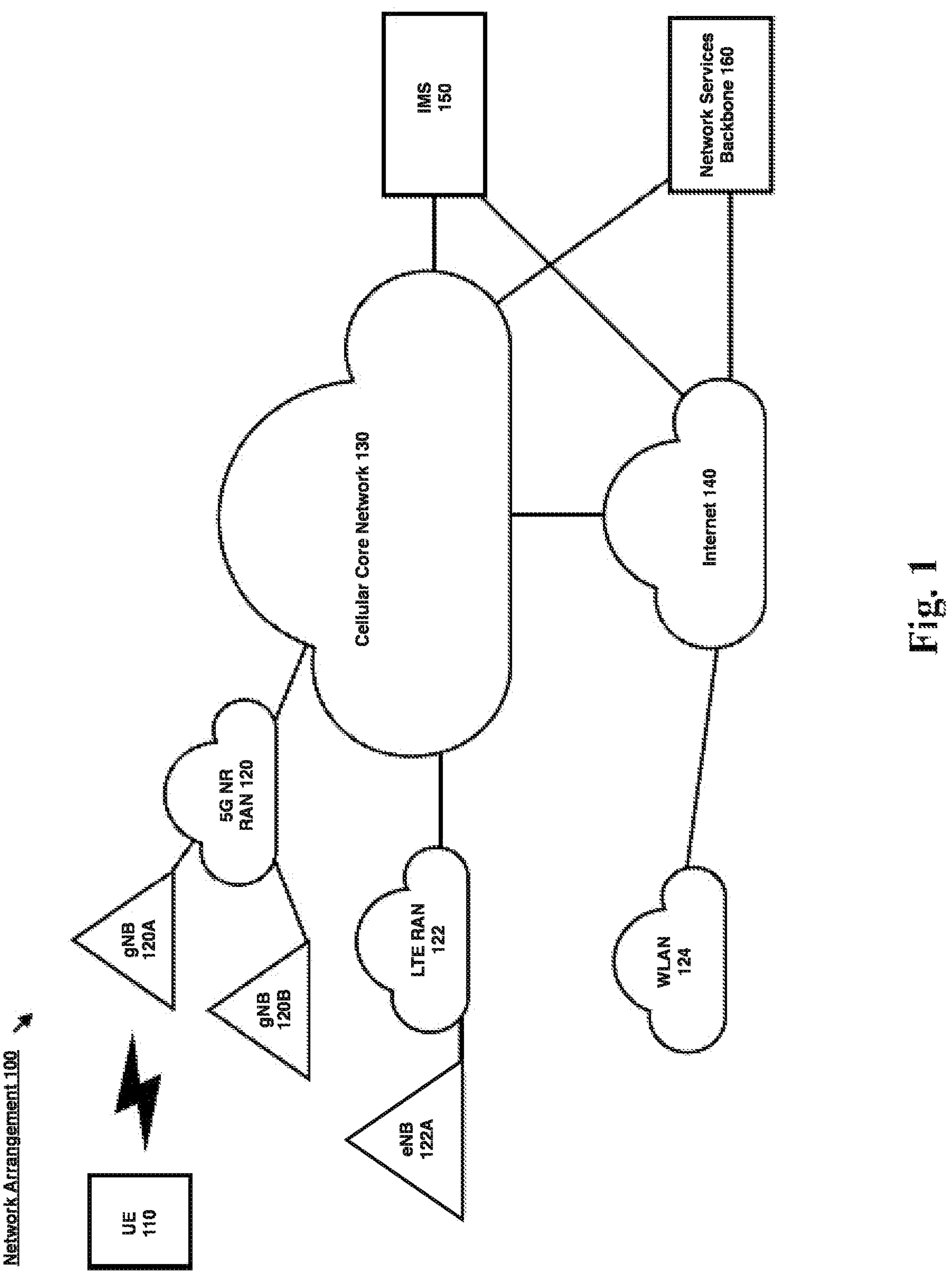
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments relate to a user equipment (UE) receiving a sounding reference signal (SRS) resource configuration and mapping an SRS resource set to a transmission and reception point (TRP) of a multi-TRP system.

The exemplary embodiments are described with regard to a UE. However, reference to a UE is merely provided for illustrative purposes. The exemplary embodiments may be utilized with any electronic component that may establish a connection to a network and is configured with the hardware, software, and/or firmware to exchange information and data with the network. Therefore, the UE as described herein is used to represent any appropriate electronic component.

In addition, the exemplary embodiments are described with regard to a 5G New Radio (NR) network. However, reference to a 5G NR network is merely provided for illustrative purposes. The exemplary embodiments may be utilized with any network that implements the functionalities described herein for a network.

A next generation NodeB (gNB) of a 5G NR network configures a UE with one or more SRS resource sets. In an downlink control information (DCI) transmission for uplink (e.g., DCI Format 0_1, 0_2), the gNB provides an SRS resource indicator (SRI) indicating which SRS resource (Codebook or nonCodebook) in the SRS resource set should be activated. However, the current 3GPP standards do not address the configuration and activation of multiple SRS resources corresponding to multiple TRPs in a multi-TRP operation.

According to the exemplary embodiments, an enhanced SRI indication is provided, where the gNB configures the UE with multiple SRS resource sets (e.g., two resource sets) corresponding to multiple TRPs (e.g., two TRPs) and transmits a DCI to the UE with an SRI indicating which SRS resource in each resource set should be selected for a corresponding PUSCH transmission. While the exemplary embodiments are described with reference to two (2) TRPs, those skilled in the art will understand that the principles described herein may be used to extend the exemplary embodiments to more than two TRPs.

FIG. 1 shows an exemplary network arrangement 100 according to various exemplary embodiments. The exemplary network arrangement 100 includes a UE 110. It should be noted that any number of UE may be used in the network arrangement 100. Those skilled in the art will understand that the UE 110 may alternatively be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network configuration 100, the networks with which the UE 110 may wirelessly communicate are a 5G New Radio (NR) radio access network (5G NR-RAN) 120, an LTE radio access network (LTE-RAN) 122 and a wireless local access network (WLAN) 124. However, it should be understood that the UE 110 may also communicate with other types of networks and the UE 110 may also communicate with networks over a wired connection. Therefore, the UE 110 may include a 5G NR chipset to communicate with the 5G NR-RAN 120, an LTE chipset to communicate with the LTE-RAN 122 and an ISM chipset to communicate with the WLAN 124.

The 5G NR-RAN 120 and the LTE-RAN 122 may be portions of cellular networks that may be deployed by cellular providers (e.g., Verizon, AT&T, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UE that are equipped with the appropriate cellular chip set. The WLAN 124 may include any type of wireless local area network (WiFi, Hot Spot, IEEE 802.11x networks, etc.).

The UE 110 may connect to the 5G NR-RAN 120 via the gNB 120A and/or the gNB 120B. The gNBs 120A and 120B may be configured with the necessary hardware (e.g., antenna array), software and/or firmware to perform massive multiple in multiple out (MIMO) functionality. Massive MIMO may refer to a base station that is configured to generate a plurality of beams for a plurality of UE. During operation, the UE 110 may be within range of a plurality of gNBs. Reference to two gNBs 120A, 120B is merely for illustrative purposes. The exemplary embodiments may apply to any appropriate number of gNBs. Further, the UE 110 may communicate with the eNB 122A of the LTE-RAN 122 to transmit and receive control information used for downlink and/or uplink synchronization with respect to the 5G NR-RAN 120 connection.

Those skilled in the art will understand that any association procedure may be performed for the UE 110 to connect to the 5G NR-RAN 120. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific base station (e.g., the gNB 120A of the 5G NR-RAN 120).

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
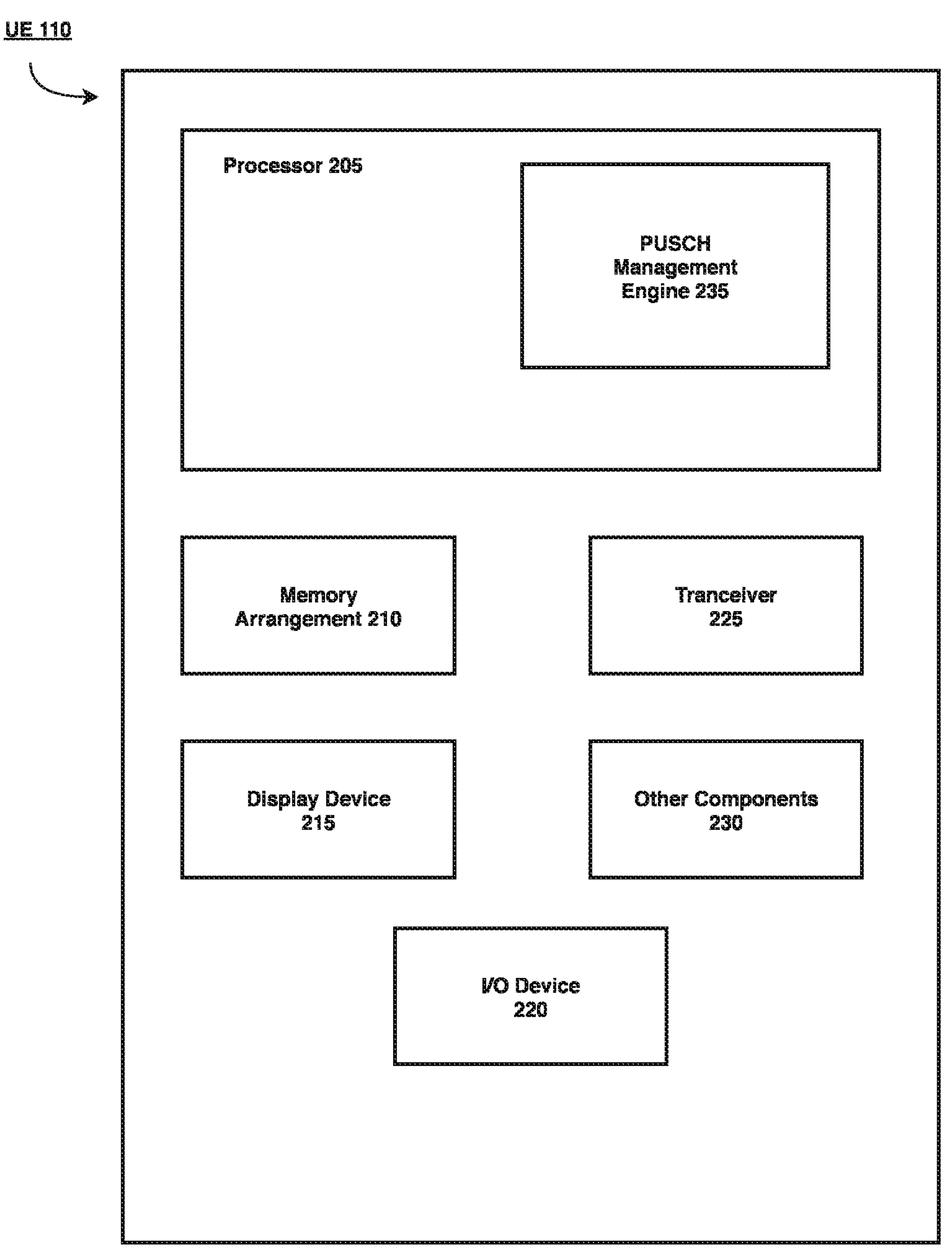
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225 and other components 230. The other components 230 may include, for example, an audio input device, an audio output device, a battery that provides a limited power supply, a data acquisition device, ports to electrically connect the UE 110 to other electronic devices, one or more antenna panels, etc. For example, the UE 110 may be coupled to an industrial device via one or more ports.

The processor 205 may be configured to execute a plurality of engines of the UE 110. For example, the engines may include a PUSCH management engine 235. The PUSCH management engine 235 may perform various operations related to receiving an SRS resource configuration for multiple PUSCH transmissions to corresponding multiple TRPs.

The above referenced engine being an application (e.g., a program) executed by the processor 205 is only exemplary. The functionality associated with the engine may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UE, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, the LTE-RAN 122, the WLAN 124, etc. Accordingly, the transceiver 225 may operate on a variety of different frequencies or channels (e.g., set of consecutive frequencies).

Figure 3:
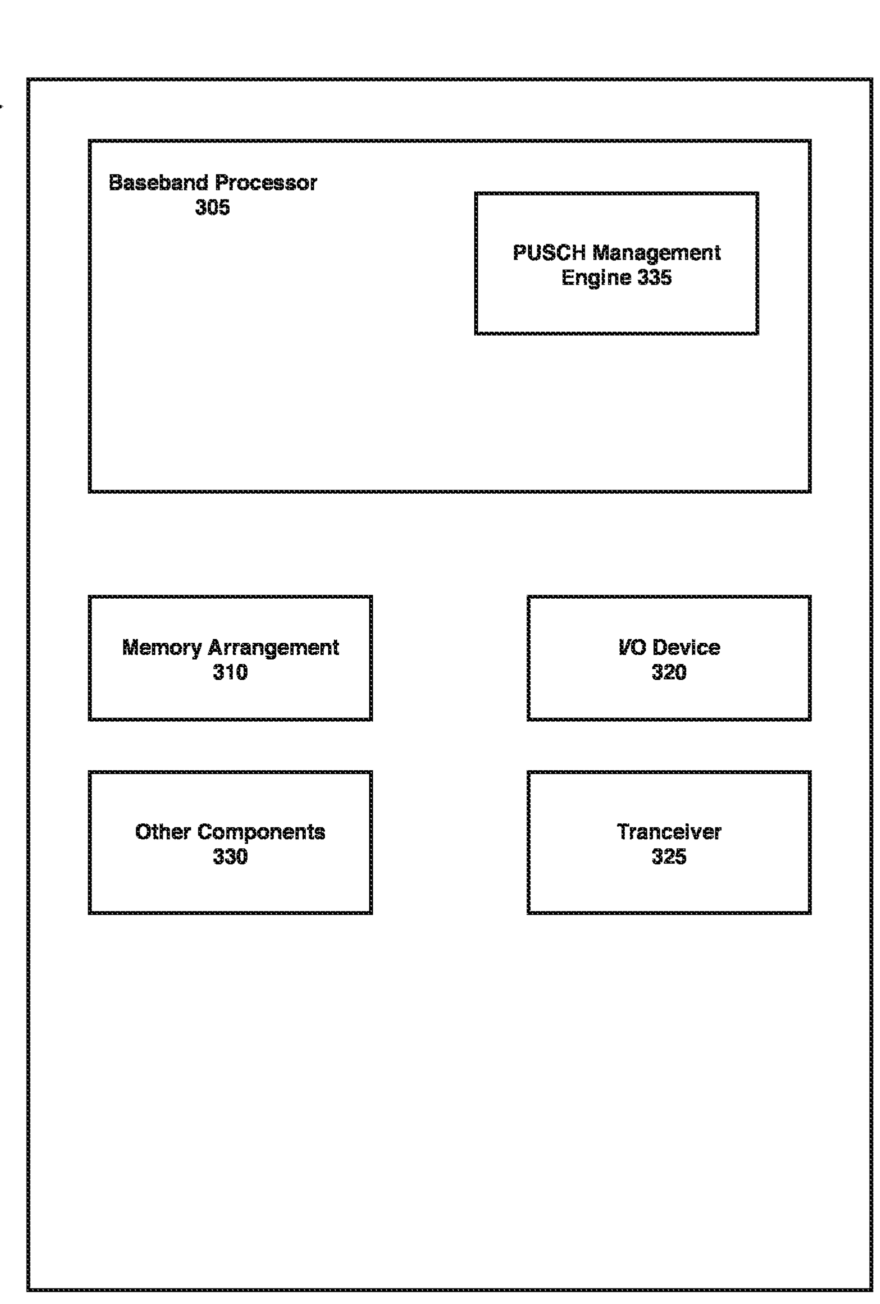
FIG. 3 shows an exemplary base station according to various exemplary embodiments.

FIG. 3 shows an exemplary network cell, in this case gNB 120A, according to various exemplary embodiments. The gNB 120A may represent any access node of the 5G NR network through which the UEs 110 may establish a connection. The gNB 120A illustrated in FIG. 3 may also represent the gNB 120B.

The gNB 120A may include a processor 305, a memory arrangement 310, an input/output (I/O) device 320, a transceiver 325, and other components 330. The other components 330 may include, for example, a power supply, a data acquisition device, ports to electrically connect the gNB 120A to other electronic devices, etc.

The processor 305 may be configured to execute a plurality of engines of the gNB 120A. For example, the engines may include a PUSCH management engine 335 for performing operations including configuring multiple SRS resource sets corresponding to multiple TRPs and configuring one or more DCI transmissions to the UE 110 with an SRI indicating which SRS resources the UE 110 should select for PUSCH transmissions to the multiple TRPs. Examples of this process will be described in greater detail below.

The above noted engine being an application (e.g., a program) executed by the processor 305 is only exemplary. The functionality associated with the engines may also be represented as a separate incorporated component of the gNB 120A or may be a modular component coupled to the gNB 120A, e.g., an integrated circuit with or without firmware. For example, the integrated circuit may include input circuitry to receive signals and processing circuitry to process the signals and other information. In addition, in some gNBs, the functionality described for the processor 305 is split among a plurality of processors (e.g., a baseband processor, an applications processor, etc.). The exemplary aspects may be implemented in any of these or other configurations of a gNB.

The memory 310 may be a hardware component configured to store data related to operations performed by the UEs 110, 112. The I/O device 320 may be a hardware component or ports that enable a user to interact with the gNB 120A. The transceiver 325 may be a hardware component configured to exchange data with the UE 110 and any other UE in the system 100. The transceiver 325 may operate on a variety of different frequencies or channels (e.g., set of consecutive frequencies). Therefore, the transceiver 325 may include one or more components (e.g., radios) to enable the data exchange with the various networks and UEs.

Figure 4:
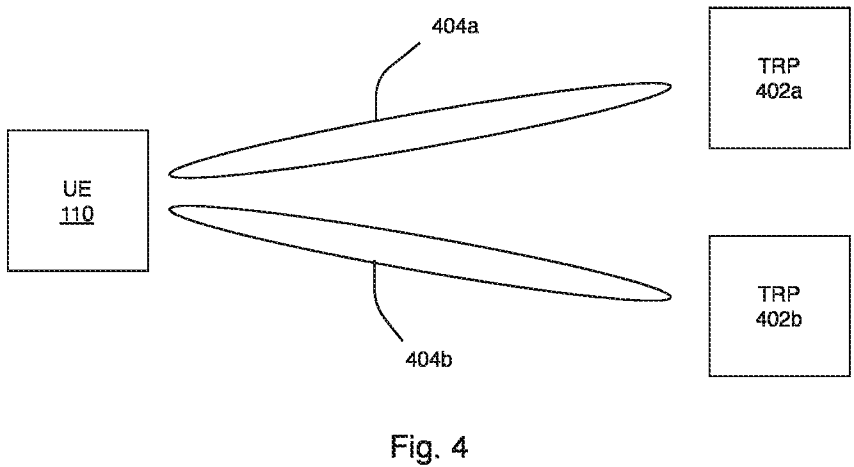
FIG. 4 shows a diagram illustrating an exemplary UE communicating with multiple transmission and reception points (TRPs) according to various exemplary embodiments.

FIG. 4 shows a diagram illustrating an exemplary UE (110) communicating with multiple TRPs 402*a*, 402*b* according to various exemplary embodiments. It should be noted that although FIG. 4 illustrates two (2) TRPs, any reference to two (2) TRPs with regards to FIG. 4 or in the following description is only exemplary and the network 100 may include any number of TRPs. As illustrated in FIG. 4, the UE 110 may communicate with a first TRP 402*a* via a first beam 404*a* and with a second TRP 402*b* over a second beam 404*b*. Each beam is associated with an SRI. It should be noted that although the first and second TRPs 402*a*, 402*b* are illustrated as two distinct and separate entities, the first and second TRPs 402*a*, 402*b* may alternatively be two antenna panels at the same location.

Figure 5:
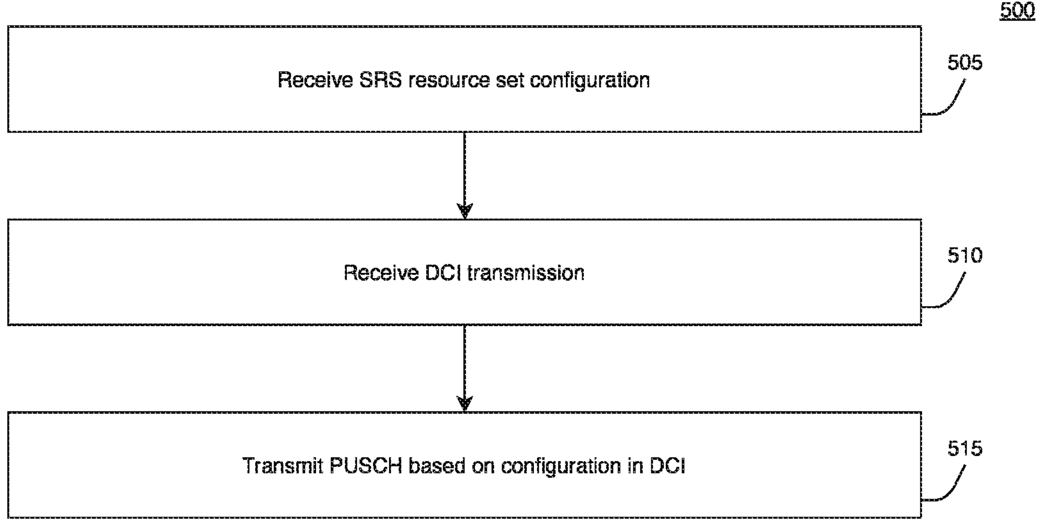
FIG. 5 shows a method of determining sounding reference signal (SRS) resources for physical uplink shared channel (PUSCH) transmissions corresponding to multiple TRPs according to various exemplary embodiments.
Figures 6A, 6B, 6C:
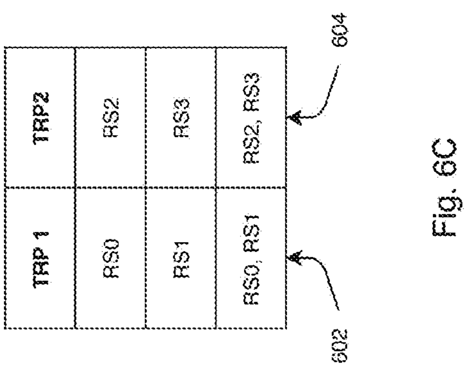
FIGS. 6A-6C show examples of SRS resource indicator (SRI) configurations according to various exemplary embodiments.

FIG. 5 shows a method 500 of determining SRS resources for PUSCH transmissions corresponding to multiple TRPs (e.g., 402*a*, 402*b*) according to various exemplary embodiments. Reference will also be made to FIGS. 6A-6C, which show examples of SRS indicator (SRI) configurations according to various exemplary embodiments. In the examples illustrated in FIGS. 6A-6C it may be considered that a first SRS resource set corresponding to a first TRP (TRP 1) includes two resources (RS0, RS1), a second SRS resource set corresponding to a second TRP (TRP 2) includes two resources (RS2, RS3), and the UE 110 supports up to two (2) uplink multiple in multiple out (MIMO) layers.

At 505, the UE 110 receives an SRS resource set configuration from the gNB 120A (or 120B). The SRS resource set configuration includes multiple configured resource sets (e.g., two) corresponding to multiple TRPs (e.g., two). The gNB 120A additionally indicates whether SRS resource sets are configured for Codebook or nonCodebook use. In some embodiments, for single DCI multi-TRP operation, the number of SRS resources in each SRS resource set is the same for all resource sets (e.g., 1 or 2 for Codebook or 1, 2, 3, or 4 for nonCodebook). In some embodiments, the number of SRS resources in each SRS resource set may alternatively be different for all resource sets.

At 510, the UE 110 receives a DCI transmission from the gNB 120A. The DCI transmission indicates an SRI indicates the selection of an SRS resource from the configured SRS resource sets. Because there are multiple configured SRS resource sets (e.g., two) corresponding to multiple TRPs (e.g., two), the SRI indicates an SRS resource from each set. In some embodiments, the SRI corresponding to a first SRS resource set and the SRI corresponding a second SRS resource set may be independently indicated in the DCI. In such an embodiment, the current bitwidth of the SRI field of the DCI may be increased (e.g., doubled) to accommodate both SRIs. In such a scenario, the first half of the SRI field corresponds to the first SRS resource set and the second half of the SRI field corresponds to the second resource set. Alternatively, the two SRIs may be independently indicated by adding a second SRI field to the DCI for the second SRS resource set.

An example of the independent provision of both SRIs corresponding to two TRPs is illustrated in FIG. 6A. The first column 602 lists the SRI indications corresponding to the first TRP and the second column 604 lists the SRI indications corresponding to the second TRP. It should be noted that these combinations may be in an increased bitwidth SRI field, as discussed above, or in first and second SRI fields, as also discussed above).

In some embodiments, for nonCodebook, the SRIs corresponding to the two SRS resource sets may be jointly encoded with some predetermined restriction. For example, as illustrated in FIG. 6B, the two SRIs may be jointly encoded with a restriction that both SRIs must have the same number of layers. As a result, only five combinations are possible in this example.

In some embodiments, the DCI transmission may alternatively include one SRI, which selects the same SRS resource index for each of the SRS resource sets. As illustrated in FIG. 6C, this results in the selection of the first resource of each set, the second resource of each set, or both resources of each set.

In some embodiments, for codebook-based PUSCH transmissions, the DCI transmission may additionally include a transmitted precoding matrix indicator (TPMI) indication (a "precoding information and number of layers" field). In some embodiments, the TPMI corresponding to the first selected/indicated SRS resource set and the TPMI corresponding the second selected/indicated SRS resource set may be independently indicated in the DCI. In such an embodiment, the current bitwidth of the TPMI field of the DCI may be increased (e.g., doubled) to accommodate both TPMIs. In such a scenario, the first half of the TPMI field corresponds to the first selected/indicated SRS resource set and the second half of the TPMI field corresponds to the second selected/indicated resource set. Alternatively, the two TPMIs may be independently indicated by adding a second TPMI field to the DCI for the second selected/indicated SRS resource set. In some embodiments, the TPMIs corresponding to the two selected/indicated SRS resource sets may be jointly encoded with some predetermined restriction (similar to that discussed above with respect to FIG. 6B). In some embodiments, the DCI transmission may alternatively include one TPMI, which indicates the same TPMI for all TRPs.

Returning to FIG. 5, at 515, the UE 110 transmits the PUSCH (and its repetitions) to their corresponding TRPs based on the configuration (SRI and TPMI, if any) included in the DCI transmission.

In some embodiments, if communication with one of the TRPs in a single DCI multiple-TRP environment is not desired, the gNB 120A may dynamically switch the UE 110 to single-TRP operation by using a reserved value for the SRI corresponding to the TRP with which communication is not desired. In some embodiments, the gNB 120A may perform this operation based on UE feedback. In some embodiments, the gNB 120A may alternatively perform this dynamic switching via RRC signaling by configuring only one SRS resource set for single-TRP operation or multiple SRS resource sets for multi-TRP operation. In some embodiments, the gNB 120A may alternatively perform this dynamic switching via a medium access control (MAC) control element (CE) transmission which activates or deactivates one or multiple configured SRS resource sets.

Although the above discussion focuses on enhancement of the SRI and TPMI (for codebook) fields of a DCI in single DCI multi-TRP operation, it should be noted that other fields in the DCI may also be similarly enhanced. For example, similar to the enhancement discussed above, the "UL/SUL indicator," "Frequency domain resource assignment," "Time domain resource assignment," "TPC command for scheduled PUSCH," "Antenna ports," "PTRS-DMRS association," "DMRS sequence initialization," and/or "Open-loop power control parameter set indication" fields may also be enhanced in a similar manner as discussed above.

Figure 7A:
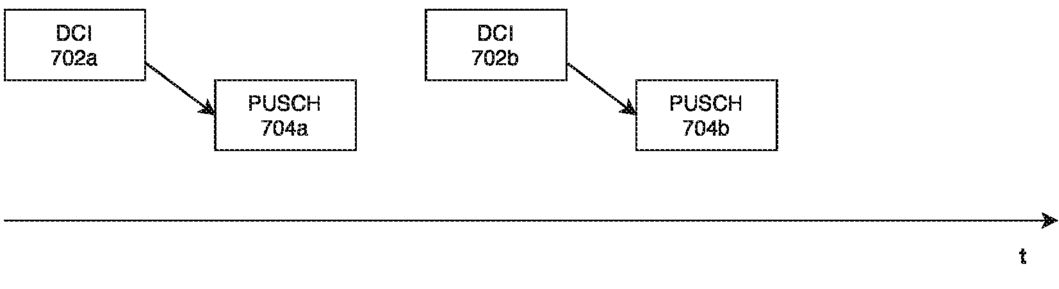
FIGS. 7A-7C show configurations UE handling of multiple downlink control information (DCI) transmissions that schedule corresponding multiple PUSCH transmissions according to various exemplary embodiments.
Figure 7B:
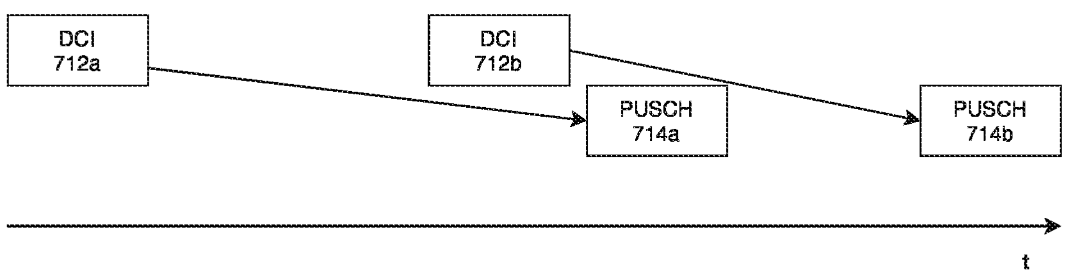
Figure 7C:
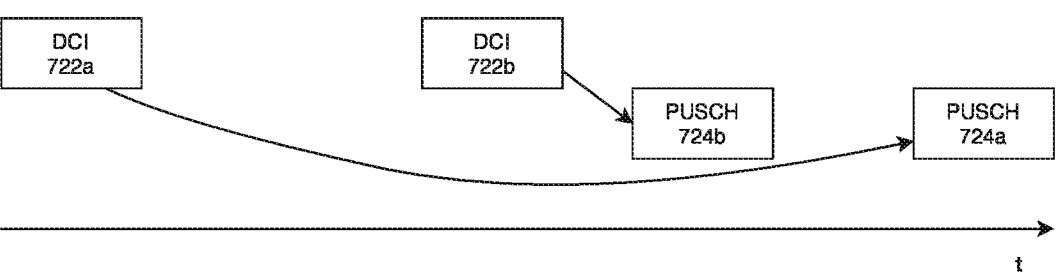

In some cases, it may be beneficial to enhance the reliability of the transport block (TB) of the PUSCH transmission by using multiple DCI (multi-DCI) multi-TRP PUSCHs. FIGS. 7A-7C show configurations of handling multiple DCI transmissions that schedule corresponding multiple PUSCH transmissions according to various exemplary embodiments. The gNB 120A may configure how the UE 110 should handle multiple DCIs and their corresponding scheduled PUSCH transmissions when the DCIs and/or their scheduled PUSCH transmissions are out of order. In some embodiments, the gNB 120A may configure the UE 110 to only process a DCI that schedules a retransmission of the same PUSCH (the same TB) if that DCI is received after the UE 110 completes the transmission of the first PUSCH. This is illustrated in FIG. 7A, which shows a first DCI 702*a*, which triggers a first PUSCH transmission 704*a*, and a second DCI 702*b*, which is received after completion of the first PUSCH transmission 704*a* and which triggers a PUSCH retransmission 704*b*. If, however, the second DCI 702*b* is received before completion of the first PUSCH transmission 704*a*, the UE 110 is not expected to process the second DCI 702*b*.

In some embodiments, the gNB 120A may alternatively configure the UE 110 to process a DCI that schedules a retransmission of the same PUSCH (the same TB) even if it is received before the UE 110 completes the transmission of the first PUSCH only if the retransmission is not scheduled before completion of the first PUSCH. This is illustrated in FIG. 7B, which shows a first DCI 712*a*, which triggers a first PUSCH 714*a*, and a second DCI 712*b*, which is received before completion of the first PUSCH 714*a* and which schedules a PUSCH retransmission 714*b* after completion of the first PUSCH 714*a*. If, however, the second DCI 712*b* schedules the PUSCH retransmission 714*b* before completion of the first PUSCH transmission 714*a*, the UE 110 is not expected to process the second DCI 712*b*.

In some embodiments, the gNB 120A may alternatively configure the UE 110 to process a DCI that schedules a retransmission of the same PUSCH (the same TB) even if it is received before the UE 110 completes the transmission of the first PUSCH and the retransmission is scheduled before completion of the first PUSCH. This is illustrated in FIG. 7C, which shows a first DCI 722*a*, which triggers a first PUSCH 724*a*, and a second DCI 722*b*, which is received before completion of the first PUSCH 724*a* and which schedules a PUSCH retransmission 724*b* before completion of the first PUSCH 724*a*.

When the DCIs and/or their scheduled PUSCH transmissions are out of order, the TB size may be determined so that the TB size of the PUSCH transmissions (the first transmission and the retransmission(s)) is the same. In some embodiments, the TB size of the first PUSCH transmission may be the TB size for all PUSCH transmissions (e.g., retransmissions). In some embodiments, the TB size of the last PUSCH transmission may alternatively be the TB size for all PUSCH transmissions (e.g., retransmissions). In some embodiments, PUSCH transmission occasions may be interleaved, but not overlapping.

Figure 8:
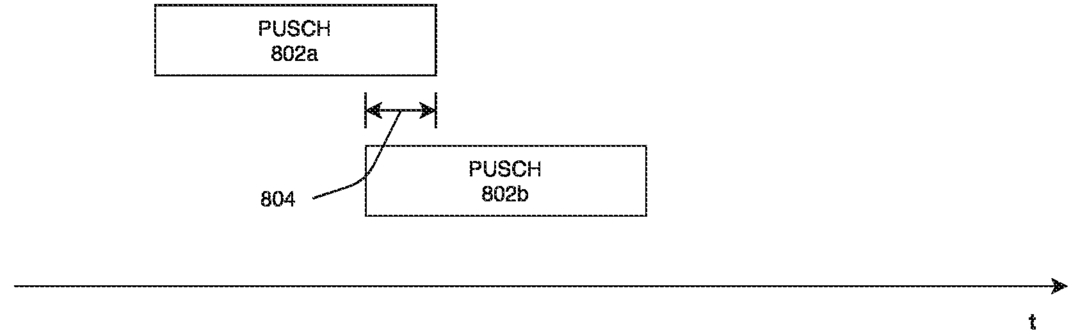
FIG. 8 shows a diagram illustrating the collision of two PUSCH transmissions according to various exemplary embodiments.

FIG. 8 shows a diagram illustrating the collision of two PUSCH transmissions according to various exemplary embodiments. For multi-DCI multi-TRP PUSCH transmissions, collisions may occur between scheduled PUSCH transmissions. As illustrated in FIG. 8, a first PUSCH 802*a* may collide with a second PUSCH 802*b*. In some embodiments, the gNB 120A may configure the UE 110 to cancel an entirety of one of the colliding PUSCH transmissions 802*a* or 802*b*.

In some embodiments, the gNB 120A may alternatively configure the UE 110 to cancel (cut short) the portion of the PUSCH transmission that overlaps with the other PUSCH transmission, as indicated by arrow 804. In such an embodiment, the UE 110 may be configured to cancel the portion of the first PUSCH 802*a* in the overlap region 804. Alternatively, the UE 110 may be configured to cancel the portion of the second PUSCH 802*b* in the overlap region 804. Alternatively, the UE 110 may be configured to cancel the portions of both the first and second PUSCHs 802*a,b* in the overlap region 804. In some embodiments, the gNB 120A may alternatively configure the UE 110 to cancel both colliding PUSCH transmissions 802*a*, 802*b* entirely.

EXAMPLES

In a first example, a processor of a user equipment (UE) configured to perform operations comprising receiving a first downlink control information (DCI) transmission scheduling a first physical uplink shared channel (PUSCH) transmission, receiving a second DCI transmission scheduling a second PUSCH transmission, and receiving an out of order configuration from a base station of a wireless network to configure how the UE handles at least one of an out of order DCI transmission and an out of order PUSCH transmission.

In a second example, the processor of the first example, wherein the out of order configuration configures the UE to process the second DCI transmission and transmit the second PUSCH transmission if the second DCI is received after the transmission of the first PUSCH transmission.

In a third example, the processor of the first example, wherein the out of order configuration configures the UE to process the second DCI transmission and transmit the second PUSCH transmission if the second PUSCH transmission is scheduled after the transmission of the first PUSCH transmission.

In a fourth example, the processor of the first example, wherein the out of order configuration configures the UE to process the second DCI transmission and transmit the second PUSCH transmission regardless of when the second DCI is received or when the second PUSCH transmission is scheduled.

In a fifth example, the processor of the first example, wherein the out of order configuration configures the UE to determine a transport block (TB) size for all PUSCH transmissions based on a first PUSCH transmission TB size.

In a sixth example, the processor of the first example, wherein the out of order configuration configures the UE to determine a TB size for all PUSCH transmissions based on a last PUSCH transmission TB size.

In a seventh example, the processor of the first example, wherein the out of order configuration configures the UE to interleave multiple PUSCH transmissions, and wherein the multiple PUSCH transmissions are non-overlapping.

In an eighth example, the processor of the first example, wherein the out of order configuration configures the UE to cancel the second PUSCH transmission if a collision occurs between the second PUSCH transmission and the first PUSCH transmission.

In a ninth example, the processor of the first example, wherein the out of order configuration configures the UE to cancel the first PUSCH transmission if a collision occurs between the second PUSCH transmission and the first PUSCH transmission.

In a tenth example, the processor of the first example, wherein the out of order configuration configures the UE to partially cancel a portion of the second PUSCH transmission that overlaps with the first PUSCH transmission if a collision occurs between the second PUSCH transmission and the first PUSCH transmission.

In an eleventh example, the processor of the first example, wherein the out of order configuration configures the UE to partially cancel a portion of the first PUSCH transmission that overlaps with the second PUSCH transmission if a collision occurs between the second PUSCH transmission and the first PUSCH transmission.

In a twelfth example, the processor of the first example, wherein the out of order configuration configures the UE to partially cancel (i) a first portion of the first PUSCH transmission that overlaps with the second PUSCH transmission and (ii) a second portion of the second PUSCH transmission that overlaps with the first PUSCH transmission if a collision occurs between the second PUSCH transmission and the first PUSCH transmission.

In a thirteenth example, the processor of the first example, wherein the out of order configuration configures the UE to cancel the first and second PUSCH transmissions if a collision occurs between the second PUSCH transmission and the first PUSCH transmission.

In a fourteenth example, the processor of the first example, wherein the second PUSCH transmission is one of (i) a retransmission of the first PUSCH transmission or (2) not a retransmission of the first PUSCH transmission.

In a fifteenth example, a processor of a base station configured to perform operations comprising transmitting, to a user equipment (UE), a sounding reference signal (SRS) resource set configuration including a first resource set corresponding to a first transmission and reception point (TRP) and a second resource set corresponding to a second TRP, transmitting, to the UE, a downlink control information (DCI) transmission including an SRS resource indicator (SRI) indicating (i) which resource from the first resource set should be selected for a first physical uplink shared channel (PUSCH) transmission to a first TRP, and (ii) which resource from the second resource set should be selected for a second PUSCH transmission to a second TRP, and receiving, from the UE, the first PUSCH transmission to the first TRP and the second PUSCH transmission to the second TRP.

In a sixteenth example, the processor of the fifteenth example, wherein the first SRS resource set and the second SRS resource set are configured for codebook use.

In a seventeenth example, the processor of the sixteenth example, wherein the first SRS resource set and the second SRS resource set are configured with the same number of SRS resources.

In an eighteenth example, the processor of the sixteenth example, wherein the first SRS resource set and the second SRS resource set are configured with a different number of SRS resources.

In a nineteenth example, the processor of the sixteenth example, wherein the SRI includes a first SRI corresponding to a first SRS resource of the first SRS resource set and a second SRI corresponding to a second SRS resource of the second resource set.

In a twentieth example, the processor of the nineteenth example, wherein a first half of an SRI field of the DCI transmission corresponds to the first SRI and a second half of the SRI field corresponds to the second SRI.

In a twenty-first example, the processor of the nineteenth example, wherein the DCI transmission comprises a first SRI field including the first SRI, and a second SRI field including the second SRI.

In a twenty-second example, the processor of the sixteenth example, wherein the DCI transmission includes a single SRI field including the SRI indicating a same resource index of both the first SRS resource set and the second SRS resource set to be selected.

In a twenty-third example, the processor of the sixteenth example, wherein the DCI transmission further comprises a transmitted precoding matrix indicator (TPMI) corresponding to each of a first SRS resource in the first SRS resource set and a second SRS resource of the second SRS resource set.

In a twenty-fourth example, the processor of the twenty-third example, wherein the TPMI includes a first TPMI corresponding to the first SRS resource and a second TPMI corresponding to the second SRS resource.

In a twenty-fifth example, the processor of the twenty-fourth example, wherein a first half of a TPMI field of the DCI transmission corresponds to the first TPMI and a second half of the TPMI field corresponds to the second TPMI.

In a twenty-sixth example, the processor of the twenty-fourth example, wherein the DCI transmission comprises a first TPMI field including the first TPMI, and a second TPMI field including the second TPMI.

In a twenty-seventh example, the processor of the twenty-fourth example, wherein the first and second TPMIs are jointly encoded.

In a twenty-eighth example, the processor of the twenty-seventh example, wherein the first and second TPMIs have the same number of layers.

In a twenty-ninth example, the processor of the twenty-third example, wherein the DCI transmission includes a single TPMI field including the TPMI for both the first and second SRS resources.

In a thirtieth example, the processor of the fifteenth example, wherein the multiple SRS resource sets are configured for nonCodebook use.

In a thirty-first example, the processor of the thirtieth example, wherein the first SRS resource set and the second SRS resource set are configured with the same number of SRS resources.

In a thirty-second example, the processor of the thirtieth example, wherein the first SRS resource set and the second SRS resource set are configured with a different number of SRS resources.

In a thirty-third example, the processor of the thirtieth example, wherein the SRI includes a first SRI corresponding to a first SRS resource of the first SRS resource set and a second SRI corresponding to a second SRS resource of the second resource set.

In a thirty-fourth example, the processor of the thirty-third example, wherein a first half of an SRI field of the DCI transmission corresponds to the first SRI and a second half of the SRI field corresponds to the second SRI.

In a thirty-fifth example, the processor of the thirty-third example, wherein the DCI transmission comprises a first SRI field including the first SRI, and a second SRI field including the second SRI.

In a thirty-sixth example, the processor of the thirty-third example, wherein the first and second SRIs are jointly encoded.

In a thirty-seventh example, the processor of the thirty-sixth example, wherein the first and second SRIs have the same number of layers.

In a thirty-eighth example, the processor of the thirtieth example, wherein the DCI transmission includes a single SRI field including the SRI indicating a same resource index of both the first and second SRS resource sets to be selected.

In a thirty-ninth example, a processor of a base station configured to perform operations comprising transmitting, to a user equipment (UE), a transmission and reception point (TRP) configuration from a base station triggering a switching between multi-TRP operation mode and single-TRP operation mode, wherein the UE is configured to switch between the multi-TRP operation mode and the single-TRP operation mode based on the configuration.

In a fortieth example, the processor of the thirty-ninth example, wherein the TRP configuration is a radio resource control (RRC) transmission that configures either (i) a single sounding reference signal (SRS) resource set for physical uplink shared channel (PUSCH) transmissions for the single-TRP operation mode, or (ii) multiple SRS resource sets for PUSCH transmissions for the multi-TRP operation mode.

In a forty-first example, the processor of the thirty-ninth example, wherein multiple SRS resource sets are configured by the base station, and wherein the TRP configuration is a medium access control (MAC) control element (CE) configured to activate a single one of the multiple SRS resource sets for the single-TRP operation mode or multiple ones of the multiple SRS resource sets for the multi-TRP operation mode.

In a forty-second example, the processor of the thirty-ninth example, wherein multiple SRS resource sets corresponding to multiple TRPs are configured by the base station, and wherein the TRP configuration is a downlink control information (DCI) transmission having (i) one or more SRS resource indicators (SRIs), each indicating an SRS resource from one of the multiple SRS resource sets to be used for a PUSCH transmission, and (ii) a reserved value SRI indicating that communication with a TRP associated with one of the multiple SRS resource sets should be discontinued.

In a forty-third example, a processor of a base station configured to perform operations comprising transmitting, to a user equipment (UE), a first downlink control information (DCI) transmission scheduling a first physical uplink shared channel (PUSCH) transmission, transmitting, to the UE, a second DCI transmission scheduling a second PUSCH transmission, and transmitting an out of order configuration to the UE to configure how the UE handles at least one of an out of order DCI transmission and an out of order PUSCH transmission.

In a forty-fourth example, the processor of the forty-third example, wherein the out of order configuration configures the UE to process the second DCI transmission and transmit the second PUSCH transmission if the second DCI is received after the transmission of the first PUSCH transmission.

In a forty-fifth example, the processor of the forty-third example, wherein the out of order configuration configures the UE to process the second DCI transmission and transmit the second PUSCH transmission if the second PUSCH transmission is scheduled after the transmission of the first PUSCH transmission.

In a forty-sixth example, the processor of the forty-third example, wherein the out of order configuration configures the UE to process the second DCI transmission and transmit the second PUSCH transmission regardless of when the second DCI is received or when the second PUSCH transmission is scheduled.

In a forty-seventh example, the processor of the forty-third example, wherein the out of order configuration configures the UE to determine a transport block (TB) size for all PUSCH transmissions based on a first PUSCH transmission TB size.

In a forty-eighth example, the processor of the forty-third example, wherein the out of order configuration configures the UE to determine a TB size for all PUSCH transmissions based on a last PUSCH transmission TB size.

In a forty-ninth example, the processor of the forty-third example, wherein the out of order configuration configures the UE to interleave multiple PUSCH transmissions, and wherein the multiple PUSCH transmissions are non-overlapping.

In a fiftieth example, the processor of the forty-third example, wherein the out of order configuration configures the UE to cancel the second PUSCH transmission if a collision occurs between the second PUSCH transmission and the first PUSCH transmission.

In a fifty-first example, the processor of the forty-third example, wherein the out of order configuration configures the UE to cancel the first PUSCH transmission if a collision occurs between the second PUSCH transmission and the first PUSCH transmission.

In a fifty-second example, the processor of the forty-third example, wherein the out of order configuration configures the UE to partially cancel a portion of the second PUSCH transmission that overlaps with the first PUSCH transmission if a collision occurs between the second PUSCH transmission and the first PUSCH transmission.

In a fifty-third example, the processor of the forty-third example, wherein the out of order configuration configures the UE to partially cancel a portion of the first PUSCH transmission that overlaps with the second PUSCH transmission if a collision occurs between the second PUSCH transmission and the first PUSCH transmission.

In a fifty-fourth example, the processor of the forty-third example, wherein the out of order configuration configures the UE to partially cancel (i) a first portion of the first PUSCH transmission that overlaps with the second PUSCH transmission and (ii) a second portion of the second PUSCH transmission that overlaps with the first PUSCH transmission if a collision occurs between the second PUSCH transmission and the first PUSCH transmission.

In a fifty-fifth example, the processor of the forty-third example, wherein the out of order configuration configures the UE to cancel the first and second PUSCH transmissions if a collision occurs between the second PUSCH transmission and the first PUSCH transmission.

In a fifty-sixth example, the processor of the forty-third example, wherein the second PUSCH transmission is one of (i) a retransmission of the first PUSCH transmission or (2) not a retransmission of the first PUSCH transmission.

In a fifty-seventh example, a user equipment (UE) comprising a transceiver configured to communicate with a network, and a processor communicatively coupled to the transceiver and configured to perform operations comprising receiving a sounding reference signal (SRS) resource set configuration including a first resource set corresponding to a first transmission and reception point (TRP) and a second resource set corresponding to a second TRP, receiving a downlink control information (DCI) transmission including an SRS resource indicator (SRI) indicating (i) which resource from the first resource set should be selected for a first physical uplink shared channel (PUSCH) transmission to a first TRP, and (ii) which resource from the second resource set should be selected for a second PUSCH transmission to a second TRP, and transmitting the first PUSCH transmission to the first TRP and the second PUSCH transmission to the second TRP.

In a fifty-eighth example, the UE of the fifty-seventh example, wherein the first SRS resource set and the second SRS resource set are configured for codebook use.

In a fifty-ninth example, the UE of the fifty-eighth example, wherein the first SRS resource set and the second SRS resource set are configured with the same number of SRS resources.

In a sixtieth example, the UE of the fifty-eighth example, wherein the first SRS resource set and the second SRS resource set are configured with a different number of SRS resources.

In a sixty-first example, the UE of the fifty-eighth example, wherein the SRI includes a first SRI corresponding to a first SRS resource of the first SRS resource set and a second SRI corresponding to a second SRS resource of the second resource set.

In a sixty-second example, the UE of the sixty-first example, wherein a first half of an SRI field of the DCI transmission corresponds to the first SRI and a second half of the SRI field corresponds to the second SRI.

In a sixty-third example, the UE of the sixty-first example, wherein the DCI transmission comprises a first SRI field including the first SRI, and a second SRI field including the second SRI.

In a sixty-fourth example, the UE of the fifty-eighth example, wherein the DCI transmission includes a single SRI field including the SRI indicating a same resource index of both the first SRS resource set and the second SRS resource set to be selected.

In a sixty-fifth example, the UE of the fifty-eighth example, wherein the DCI transmission further comprises a transmitted precoding matrix indicator (TPMI) corresponding to each of a first SRS resource in the first SRS resource set and a second SRS resource of the second SRS resource set.

In a sixty-sixth example, the UE of the sixty-fifth example, wherein the TPMI includes a first TPMI corresponding to the first SRS resource and a second TPMI corresponding to the second SRS resource.

In a sixty-seventh example, the UE of the sixty-sixth example, wherein a first half of a TPMI field of the DCI transmission corresponds to the first TPMI and a second half of the TPMI field corresponds to the second TPMI.

In a sixty-eighth example, the UE of the sixty-sixth example, wherein the DCI transmission comprises a first TPMI field including the first TPMI, and a second TPMI field including the second TPMI.

In a sixty-ninth example, the UE of the sixty-sixth example, wherein the first and second TPMIs are jointly encoded.

In a seventieth example, the UE of the sixty-ninth example, wherein the first and second TPMIs have the same number of layers.

In a seventy-first example, the UE of the sixty-fifth example, wherein the DCI transmission includes a single TPMI field including the TPMI for both the first and second SRS resources.

In a seventy-second example, the UE of the fifty-seventh example, wherein the multiple SRS resource sets are configured for nonCodebook use.

In a seventy-third example, the UE of the seventy-second example, wherein the first SRS resource set and the second SRS resource set are configured with the same number of SRS resources.

In a seventy-fourth example, the UE of the seventy-second example, wherein the first SRS resource set and the second SRS resource set are configured with a different number of SRS resources.

In a seventy-fifth example, the UE of the seventy-second example, wherein the SRI includes a first SRI corresponding to a first SRS resource of the first SRS resource set and a second SRI corresponding to a second SRS resource of the second resource set.

In a seventy-sixth example, the UE of the seventy-fifth example, wherein a first half of an SRI field of the DCI transmission corresponds to the first SRI and a second half of the SRI field corresponds to the second SRI.

In a seventy-seventh example, the UE of the seventy-fifth example, wherein the DCI transmission comprises a first SRI field including the first SRI, and a second SRI field including the second SRI.

In a seventy-eighth example, the UE of the seventy-fifth example, wherein the first and second SRIs are jointly encoded.

In a seventy-ninth example, the UE of the seventy-eighth example, wherein the first and second SRIs have the same number of layers.

In an eightieth example, the UE of the seventy-second example, wherein the DCI transmission includes a single SRI field including the SRI indicating a same resource index of both the first and second SRS resource sets to be selected.

In an eighty-first example, a user equipment (UE) comprising a transceiver configured to communicate with a network, and a processor communicatively coupled to the transceiver and configured to perform operations comprising receiving a transmission and reception point (TRP) configuration from a base station triggering a switching between multi-TRP operation mode and single-TRP operation mode, and switching between the multi-TRP operation mode and the single-TRP operation mode based on the configuration.

In an eighty-second example, the UE of the eighty-first example, wherein the TRP configuration is a radio resource control (RRC) transmission that configures either (i) a single sounding reference signal (SRS) resource set for physical uplink shared channel (PUSCH) transmissions for the single-TRP operation mode, or (ii) multiple SRS resource sets for PUSCH transmissions for the multi-TRP operation mode.

In an eighty-third example, the UE of the eighty-first example, wherein multiple SRS resource sets are configured by the base station, and wherein the TRP configuration is a medium access control (MAC) control element (CE) configured to activate a single one of the multiple SRS resource sets for the single-TRP operation mode or multiple ones of the multiple SRS resource sets for the multi-TRP operation mode.

In an eighty-fourth example, the UE of the eighty-first example, wherein multiple SRS resource sets corresponding to multiple TRPs are configured by the base station, and wherein the TRP configuration is a downlink control information (DCI) transmission having (i) one or more SRS resource indicators (SRIs), each indicating an SRS resource from one of the multiple SRS resource sets to be used for a PUSCH transmission, and (ii) a reserved value SRI indicating that communication with a TRP associated with one of the multiple SRS resource sets should be discontinued.

In an eighty-fifth example, a user equipment (UE) comprising a transceiver configured to communicate with a network, and a processor communicatively coupled to the transceiver and configured to perform operations comprising receiving a first downlink control information (DCI) transmission scheduling a first physical uplink shared channel (PUSCH) transmission, receiving a second DCI transmission scheduling a second PUSCH transmission, and receiving an out of order configuration from a base station of a wireless network to configure how the UE handles at least one of an out of order DCI transmission and an out of order PUSCH transmission.

In an eighty-sixth example, the UE of the eighty-fifth example, wherein the out of order configuration configures the UE to process the second DCI transmission and transmit the second PUSCH transmission if the second DCI is received after the transmission of the first PUSCH transmission.

In an eighty-seventh example, the UE of the eighty-fifth example, wherein the out of order configuration configures the UE to process the second DCI transmission and transmit the second PUSCH transmission if the second PUSCH transmission is scheduled after the transmission of the first PUSCH transmission.

In an eighty-eighth example, the UE of the eighty-fifth example, wherein the out of order configuration configures the UE to process the second DCI transmission and transmit the second PUSCH transmission regardless of when the second DCI is received or when the second PUSCH transmission is scheduled.

In an eighty-ninth example, the UE of the eighty-fifth example, wherein the out of order configuration configures the UE to determine a transport block (TB) size for all PUSCH transmissions based on a first PUSCH transmission TB size.

In a ninetieth example, the UE of the eighty-fifth example, wherein the out of order configuration configures the UE to determine a TB size for all PUSCH transmissions based on a last PUSCH transmission TB size.

In a ninety-first example, the UE of the eighty-fifth example, wherein the out of order configuration configures the UE to interleave multiple PUSCH transmissions, and wherein the multiple PUSCH transmissions are non-overlapping.

In a ninety-second example, the UE of the eighty-fifth example, wherein the out of order configuration configures the UE to cancel the second PUSCH transmission if a collision occurs between the second PUSCH transmission and the first PUSCH transmission.

In a ninety-third example, the UE of the eighty-fifth example, wherein the out of order configuration configures the UE to cancel the first PUSCH transmission if a collision occurs between the second PUSCH transmission and the first PUSCH transmission.

In a ninety-fourth example, the UE of the eighty-fifth example, wherein the out of order configuration configures the UE to partially cancel a portion of the second PUSCH transmission that overlaps with the first PUSCH transmission if a collision occurs between the second PUSCH transmission and the first PUSCH transmission.

In a ninety-fifth example, the UE of the eighty-fifth example, wherein the out of order configuration configures the UE to partially cancel a portion of the first PUSCH transmission that overlaps with the second PUSCH transmission if a collision occurs between the second PUSCH transmission and the first PUSCH transmission.

In a ninety-sixth example, the UE of the eighty-fifth example, wherein the out of order configuration configures the UE to partially cancel (i) a first portion of the first PUSCH transmission that overlaps with the second PUSCH transmission and (ii) a second portion of the second PUSCH transmission that overlaps with the first PUSCH transmission if a collision occurs between the second PUSCH transmission and the first PUSCH transmission.

In a ninety-seventh example, the UE of the eighty-fifth example, wherein the out of order configuration configures the UE to cancel the first and second PUSCH transmissions if a collision occurs between the second PUSCH transmission and the first PUSCH transmission.

In a ninety-eighth example, the UE of the eighty-fifth example, wherein the second PUSCH transmission is one of (i) a retransmission of the first PUSCH transmission or (2) not a retransmission of the first PUSCH transmission.

In a one hundredth example, a base station comprising a transceiver configured to communicate with a user equipment (UE), and a processor communicatively coupled to the transceiver and configured to perform operations comprising transmitting, to the UE, a sounding reference signal (SRS) resource set configuration including a first resource set corresponding to a first transmission and reception point (TRP) and a second resource set corresponding to a second TRP, transmitting, to the UE, a downlink control information (DCI) transmission including an SRS resource indicator (SRI) indicating (i) which resource from the first resource set should be selected for a first physical uplink shared channel (PUSCH) transmission to a first TRP, and (ii) which resource from the second resource set should be selected for a second PUSCH transmission to a second TRP, and receiving, from the UE, the first PUSCH transmission to the first TRP and the second PUSCH transmission to the second TRP.

In a one hundred and first example, the base station of the one hundredth example, wherein the first SRS resource set and the second SRS resource set are configured for codebook use.

In a one hundred and second example, the base station of the one hundred and first example, wherein the first SRS resource set and the second SRS resource set are configured with the same number of SRS resources.

In an one hundred and third example, the base station of the one hundred and first example, wherein the first SRS resource set and the second SRS resource set are configured with a different number of SRS resources.

In a one hundred and fourth example, the base station of the one hundred and first example, wherein the SRI includes a first SRI corresponding to a first SRS resource of the first SRS resource set and a second SRI corresponding to a second SRS resource of the second resource set.

In a one hundred and fifth example, the base station of the one hundred and fourth example, wherein a first half of an SRI field of the DCI transmission corresponds to the first SRI and a second half of the SRI field corresponds to the second SRI.

In a one hundred and sixth example, the base station of the one hundred and fourth example, wherein the DCI transmission comprises a first SRI field including the first SRI, and a second SRI field including the second SRI.

In a one hundred and seventh example, the base station of the one hundred and first example, wherein the DCI transmission includes a single SRI field including the SRI indicating a same resource index of both the first SRS resource set and the second SRS resource set to be selected.

In a one hundred and eighth example, the base station of the one hundred and first example, wherein the DCI transmission further comprises a transmitted precoding matrix indicator (TPMI) corresponding to each of a first SRS resource in the first SRS resource set and a second SRS resource of the second SRS resource set.

In a one hundred and ninth example, the base station of the one hundred and eighth example, wherein the TPMI includes a first TPMI corresponding to the first SRS resource and a second TPMI corresponding to the second SRS resource.

In a one hundred and tenth example, the base station of the one hundred and ninth example, wherein a first half of a TPMI field of the DCI transmission corresponds to the first TPMI and a second half of the TPMI field corresponds to the second TPMI.

In a one hundred and eleventh example, the base station of the one hundred and ninth example, wherein the DCI transmission comprises a first TPMI field including the first TPMI, and a second TPMI field including the second TPMI.

In a one hundred and twelfth example, the base station of the one hundred and ninth example, wherein the first and second TPMIs are jointly encoded.

In a one hundred and thirteenth example, the base station of the one hundred and twelfth example, wherein the first and second TPMIs have the same number of layers.

In a one hundred and fourteenth example, the base station of the one hundred and eighth example, wherein the DCI transmission includes a single TPMI field including the TPMI for both the first and second SRS resources.

In a one hundred and fifteenth example, the base station of the one hundredth example, wherein the multiple SRS resource sets are configured for nonCodebook use.

In a one hundred and sixteenth example, the base station of the one hundred and fifteenth example, wherein the first SRS resource set and the second SRS resource set are configured with the same number of SRS resources.

In a one hundred and seventeenth example, the base station of the one hundred and fifteenth example, wherein the first SRS resource set and the second SRS resource set are configured with a different number of SRS resources.

In a one hundred and eighteenth example, the base station of the one hundred and fifteenth example, wherein the SRI includes a first SRI corresponding to a first SRS resource of the first SRS resource set and a second SRI corresponding to a second SRS resource of the second resource set.

In a one hundred and nineteenth example, the base station of the one hundred and eighteenth example, wherein a first half of an SRI field of the DCI transmission corresponds to the first SRI and a second half of the SRI field corresponds to the second SRI.

In a one hundred and twentieth example, the base station of the one hundred and eighteenth example, wherein the DCI transmission comprises a first SRI field including the first SRI, and a second SRI field including the second SRI.

In a one hundred and twenty-first example, the base station of the one hundred and eighteenth example, wherein the first and second SRIs are jointly encoded.

In a one hundred and twenty-second example, the base station of the one hundred and twenty first example, wherein the first and second SRIs have the same number of layers.

In a one hundred and twenty-third example, the base station of the one hundred and fifteenth example, wherein the DCI transmission includes a single SRI field including the SRI indicating a same resource index of both the first and second SRS resource sets to be selected.

In a one hundred and twenty-fourth example, a base station comprising a transceiver configured to communicate with a user equipment (UE), and a processor communicatively coupled to the transceiver and configured to perform operations comprising transmitting, to a user equipment (UE), a transmission and reception point (TRP) configuration from a base station triggering a switching between multi-TRP operation mode and single-TRP operation mode, wherein the UE is configured to switch between the multi-TRP operation mode and the single-TRP operation mode based on the configuration.

In a one hundred and twenty-fifth example, the base station of the one hundred and twenty-fourth example, wherein the TRP configuration is a radio resource control (RRC) transmission that configures either (i) a single sounding reference signal (SRS) resource set for physical uplink shared channel (PUSCH) transmissions for the single-TRP operation mode, or (ii) multiple SRS resource sets for PUSCH transmissions for the multi-TRP operation mode.

In a one hundred and twenty-sixth example, the base station of the one hundred and twenty-fourth example, wherein multiple SRS resource sets are configured by the base station, and wherein the TRP configuration is a medium access control (MAC) control element (CE) configured to activate a single one of the multiple SRS resource sets for the single-TRP operation mode or multiple ones of the multiple SRS resource sets for the multi-TRP operation mode.

In a one hundred and twenty-seventh example, the base station of the one hundred and twenty-fourth example, wherein multiple SRS resource sets corresponding to multiple TRPs are configured by the base station, and wherein the TRP configuration is a downlink control information (DCI) transmission having (i) one or more SRS resource indicators (SRIs), each indicating an SRS resource from one of the multiple SRS resource sets to be used for a PUSCH transmission, and (ii) a reserved value SRI indicating that communication with a TRP associated with one of the multiple SRS resource sets should be discontinued.

In a one hundred and twenty-eighth example, a base station comprising a transceiver configured to communicate with a user equipment (UE), and a processor communicatively coupled to the transceiver and configured to perform operations comprising transmitting, to a user equipment (UE), a first downlink control information (DCI) transmission scheduling a first physical uplink shared channel (PUSCH) transmission, transmitting, to the UE, a second DCI transmission scheduling a second PUSCH transmission, and transmitting an out of order configuration to the UE to configure how the UE handles at least one of an out of order DCI transmission and an out of order PUSCH transmission.

In a one hundred and twenty-ninth example, the base station of the one hundred and twenty-eighth example, wherein the out of order configuration configures the UE to process the second DCI transmission and transmit the second PUSCH transmission if the second DCI is received after the transmission of the first PUSCH transmission.

In a one hundred and thirtieth example, the base station of the one hundred and twenty-eighth example, wherein the out of order configuration configures the UE to process the second DCI transmission and transmit the second PUSCH transmission if the second PUSCH transmission is scheduled after the transmission of the first PUSCH transmission.

In a one hundred and thirty-first example, the base station of the one hundred and twenty-eighth example, wherein the out of order configuration configures the UE to process the second DCI transmission and transmit the second PUSCH transmission regardless of when the second DCI is received or when the second PUSCH transmission is scheduled.

In a one hundred and thirty-second example, the base station of the one hundred and twenty-eighth example, wherein the out of order configuration configures the UE to determine a transport block (TB) size for all PUSCH transmissions based on a first PUSCH transmission TB size.

In a one hundred and thirty-third example, the base station of the one hundred and twenty-eighth example, wherein the out of order configuration configures the UE to determine a TB size for all PUSCH transmissions based on a last PUSCH transmission TB size.

In a one hundred and thirty-fourth example, the base station of the one hundred and twenty-eighth example, wherein the out of order configuration configures the UE to interleave multiple PUSCH transmissions, and wherein the multiple PUSCH transmissions are non-overlapping.

In a one hundred and thirty-fifth example, the base station of the one hundred and twenty-eighth example, wherein the out of order configuration configures the UE to cancel the second PUSCH transmission if a collision occurs between the second PUSCH transmission and the first PUSCH transmission.

In a one hundred and thirty-sixth example, the base station of the one hundred and twenty-eighth example, wherein the out of order configuration configures the UE to cancel the first PUSCH transmission if a collision occurs between the second PUSCH transmission and the first PUSCH transmission.

In a one hundred and thirty-seventh example, the base station of the one hundred and twenty-eighth example, wherein the out of order configuration configures the UE to partially cancel a portion of the second PUSCH transmission that overlaps with the first PUSCH transmission if a collision occurs between the second PUSCH transmission and the first PUSCH transmission.

In a one hundred and thirty-eighth example, the base station of the one hundred and twenty-eighth example, wherein the out of order configuration configures the UE to partially cancel a portion of the first PUSCH transmission that overlaps with the second PUSCH transmission if a collision occurs between the second PUSCH transmission and the first PUSCH transmission.

In a one hundred and thirty-ninth example, the base station of the one hundred and twenty-eighth example, wherein the out of order configuration configures the UE to partially cancel (i) a first portion of the first PUSCH transmission that overlaps with the second PUSCH transmission and (ii) a second portion of the second PUSCH transmission that overlaps with the first PUSCH transmission if a collision occurs between the second PUSCH transmission and the first PUSCH transmission.

In a one hundred and fortieth example, the base station of the one hundred and twenty-eighth example, wherein the out of order configuration configures the UE to cancel the first and second PUSCH transmissions if a collision occurs between the second PUSCH transmission and the first PUSCH transmission.

In a one hundred and forty-first example, the base station of the one hundred and twenty-eighth example, wherein the second PUSCH transmission is one of (i) a retransmission of the first PUSCH transmission or (2) not a retransmission of the first PUSCH transmission.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. The exemplary embodiments of the above-described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A processor of a user equipment (UE) configured to perform operations comprising:

receiving a transmission and reception point (TRP) configuration from a base station triggering a switching between multi-TRP operation mode and single-TRP operation mode, wherein multiple sounding reference signal (SRS) resource sets are configured for one of either codebook or noncodebook use;

when the multiple SRS resource sets are configured for codebook use, each SRS resource set includes a same number of SRS resources;

when the multiple SRS resource sets are configured for noncodebook use, each SRS resource set includes a same number of SRS resources;

receiving downlink control information (DCI) including an SRS resource indicator (SRI) indicating a first resource set for a first physical uplink shared channel (PUSCH) transmission and a second resource set for a second PUSCH transmission, the DCI further including a first transmit power control (TPC) command, a second TPC command, a first phase tracking reference signal (PTRS) and demodulation reference signal (DMRS) association parameter and a second PTRS and DMRS association parameter corresponding to the SRI; and switching between the multi-TRP operation mode and the single-TRP operation mode based on the configuration.

2. The processor of claim 1, wherein the TRP configuration is a radio resource control (RRC) transmission that configures a single sounding reference signal (SRS) resource set for physical uplink shared channel (PUSCH) transmissions for the single-TRP operation mode.

3. The processor of claim 1, wherein the TRP configuration is a medium access control (MAC) control element (CE) configured to activate a single one of the multiple SRS resource sets for the single-TRP operation mode.

4. The processor of claim 1, wherein the TRP configuration is a downlink control information (DCI) transmission having (i) one or more SRS resource indicators (SRIs), each indicating an SRS resource from one of the multiple SRS resource sets to be used for a PUSCH transmission, and (ii) a reserved value SRI indicating that communication with a TRP associated with one of the multiple SRS resource sets is discontinued.

5. The processor of claim 1, wherein the TRP configuration is a radio resource control (RRC) transmission that configures the multiple SRS resource sets for PUSCH transmissions for the multi-TRP operation mode.

6. The processor of claim 1, wherein the TRP configuration is a medium access control (MAC) control element (CE) configured to activate multiple ones of the multiple SRS resource sets for the multi-TRP operation mode.

7. A user equipment (UE), comprising:

a transceiver configured to communicate with a base station; and a processor configured to:

receive a transmission and reception point (TRP) configuration from the base station, wherein the TRP configuration is configured to trigger a switch between multi-TRP operation mode and single-TRP operation mode, wherein multiple sounding reference signal (SRS) resource sets are configured for one of either codebook or noncodebook use;

when the multiple SRS resource sets are configured for codebook use, each SRS resource set includes a same number of SRS resources;

when the multiple SRS resource sets are configured for noncodebook use, each SRS resource set includes a same number of SRS resources;

receiving downlink control information (DCI) including an SRS resource indicator (SRI) indicating a first resource set for a first physical uplink shared channel (PUSCH) transmission and a second resource set for a second PUSCH transmission, the DCI further including a first transmit power control (TPC) command, a second TPC command, a first phase tracking reference signal (PTRS) and demodulation reference signal (DMRS) association parameter and a second PTRS and DMRS association parameter corresponding to the SRI; and switch between the multi-TRP operation mode and the single-TRP operation mode based on the TRP configuration.

8. The UE of claim 7, wherein the TRP configuration is a radio resource control (RRC) transmission that configures a single sounding reference signal (SRS) resource set for physical uplink shared channel (PUSCH) transmissions for the single-TRP operation mode.

9. The UE of claim 7, wherein the TRP configuration is a radio resource control (RRC) transmission that configures the multiple SRS resource sets for PUSCH transmissions for the multi-TRP operation mode.

10. The UE of claim 7, wherein the TRP configuration is a medium access control (MAC) control element (CE) configured to activate a single one of the multiple SRS resource sets for the single-TRP operation mode.

11. The UE of claim 7, wherein the TRP configuration is a medium access control (MAC) control element (CE) configured to activate multiple ones of the multiple SRS resource sets for the multi-TRP operation mode.

12. The UE of claim 7, wherein the TRP configuration is a downlink control information (DCI) transmission having (i) one or more SRS resource indicators (SRIs), each indicating an SRS resource from one of the multiple SRS resource sets to be used for a PUSCH transmission, and (ii) a reserved value SRI indicating that communication with a TRP associated with one of the multiple SRS resource sets is discontinued.

13. A processor of a base station configured to perform operations comprising:

determining a transmission and reception point (TRP) configuration configured to trigger a user equipment (UE) to switch between multi-TRP operation mode and single-TRP operation mode, wherein multiple sounding reference signal (SRS) resource sets are configured for one of either codebook or noncodebook use;

when the multiple SRS resource sets are configured for codebook use, each SRS resource set includes a same number of SRS resources;

when the multiple SRS resource sets are configured for noncodebook use, each SRS resource set includes a same number of SRS resources;

generating, for transmission to the UE, downlink control information (DCI) including an SRS resource indicator (SRI) indicating a first resource set for a first physical uplink shared channel (PUSCH) transmission and a second resource set for a second PUSCH transmission, the DCI further including a first transmit power control (TPC) command, a second TPC command, a first phase tracking reference signal (PTRS) and demodulation reference signal (DMRS) association parameter and a second PTRS and DMRS association parameter corresponding to the SRI; and generating, for transmission to the UE, the TRP configuration, wherein the UE is configured to switch between the multi-TRP operation mode and the single-TRP operation mode based on the TRP configuration.

14. The processor of claim 13, wherein the TRP configuration is a radio resource control (RRC) transmission that configures a single sounding reference signal (SRS) resource set for physical uplink shared channel (PUSCH) transmissions for the single-TRP operation mode.

15. The processor of claim 13, wherein the TRP configuration is a radio resource control (RRC) transmission that configures the multiple SRS resource sets for PUSCH transmissions for the multi-TRP operation mode.

16. The processor of claim 13, wherein the TRP configuration is a medium access control (MAC) control element (CE) configured to activate a single one of the multiple SRS resource sets for the single-TRP operation mode.

17. The processor of claim 13, wherein the TRP configuration is a medium access control (MAC) control element (CE) configured to activate multiple ones of the multiple SRS resource sets for the multi-TRP operation mode.

18. The processor of claim 13, wherein the TRP configuration is a downlink control information (DCI) transmission having (i) one or more SRS resource indicators (SRIs), each indicating an SRS resource from one of the multiple SRS resource sets to be used for a PUSCH transmission, and (ii) a reserved value SRI indicating that communication with a TRP associated with one of the multiple SRS resource sets is discontinued.

* * * * *